US 8,761,563 B2

(12) United States Patent
Reeve et al.

(10) Patent No.: US 8,761,563 B2
(45) Date of Patent: Jun. 24, 2014

(54) FIBER OPTIC SPLICE TRAY

(75) Inventors: David Reeve, Taylors, SC (US); Eric Miller, Roebuck, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 12/529,670

(22) PCT Filed: Mar. 17, 2009

(86) PCT No.: PCT/US2009/037374
§ 371 (c)(1),
(2), (4) Date: Sep. 2, 2009

(87) PCT Pub. No.: WO2009/131770
PCT Pub. Date: Oct. 29, 2009

(65) Prior Publication Data
US 2011/0299820 A1   Dec. 8, 2011

Related U.S. Application Data

(60) Provisional application No. 61/046,522, filed on Apr. 21, 2008.

(51) Int. Cl.
*G02B 6/00* (2006.01)
(52) U.S. Cl.
USPC .......................................... 385/135; 385/134
(58) Field of Classification Search
None
See application file for complete search history.

(56) References Cited

U.S. PATENT DOCUMENTS

| | | | | |
|---|---|---|---|---|
| 5,189,725 A * | 2/1993 | Bensel et al. | ................ | 385/135 |
| 5,323,480 A * | 6/1994 | Mullaney et al. | ............ | 385/135 |
| 5,420,957 A * | 5/1995 | Burek et al. | .................. | 385/135 |
| 5,450,518 A * | 9/1995 | Burek et al. | .................. | 385/135 |
| 5,519,804 A * | 5/1996 | Burek et al. | .................. | 385/135 |
| 5,590,234 A * | 12/1996 | Pulido | .......................... | 385/135 |
| 5,790,741 A * | 8/1998 | Vincent et al. | ............... | 385/135 |
| 5,896,486 A * | 4/1999 | Burek et al. | .................. | 385/135 |
| 6,192,180 B1 * | 2/2001 | Kim et al. | ..................... | 385/135 |
| 6,304,707 B1 * | 10/2001 | Daems et al. | ................ | 385/135 |
| 6,353,697 B1 * | 3/2002 | Daoud | ......................... | 385/136 |
| 6,801,704 B1 * | 10/2004 | Daoud et al. | ................. | 385/136 |
| 7,310,471 B2 * | 12/2007 | Bayazit et al. | ............... | 385/135 |
| 7,418,184 B1 * | 8/2008 | Gonzales et al. | ............ | 385/135 |
| 7,764,858 B2 * | 7/2010 | Bayazit et al. | ............... | 385/135 |
| 2004/0120680 A1 | 6/2004 | Dillat | | |
| 2007/0047891 A1 | 3/2007 | Bayazit et al. | | |

FOREIGN PATENT DOCUMENTS

WO   2007/016443 A2   2/2007
WO   WO 2007016443 A2 *   2/2007   ............ H01R 13/72

* cited by examiner

*Primary Examiner* — Uyen Chau N Le
*Assistant Examiner* — Chad Smith
(74) *Attorney, Agent, or Firm* — Sughrue Mion, PLLC

(57) ABSTRACT

A fiber optic splice tray that has an increased fiber capacity and maximizes bend radius. The fiber optic splice tray has multiple manifolds that are stacked on top of each other to form manifold stacks. Also, the fiber optic splice tray has two sets of manifold stacks.

17 Claims, 4 Drawing Sheets

FIBER OPTIC SPLICE TRAY (100)

MANIFOLD (400)

FIBER OPTIC SPLICE TRAY PROJECTION (220)

FIBER OPTIC SPLICE TRAY PROJECTION (220)

FIBER OPTIC SPLICE TRAY

CROSS-REFERENCE TO RELATED APPLICATIONS

This application claims the benefit of U.S. Provisional Application No. 61/046,522 filed Apr. 21, 2008. The entire disclosure of the prior application, U.S. Application No. 61/046,522, is hereby incorporated by reference.

BACKGROUND OF THE INVENTION

1. Field of the Invention

Apparatuses consistent with the present invention relate to fiber optic splice trays. More particularly, the present invention relates to fiber optic splice trays that include structures to hold the spliced pairs of optical fibers.

2. Description of the Related Art

In order to join optical fibers from two or more optical fiber cables, the optical fibers must be spliced to allow the optical signal to pass with minimal loss or reflection from one optical fiber to the next. Also, there are often many fibers in optical fiber cables. In order to join optical fiber cables, each optical fiber in an optical fiber cable must be individually spliced with a corresponding optical fiber of another optical fiber cable to form spliced pairs of optical fibers. Fiber optic splice trays have been used in order to hold these spliced pairs of optical fibers.

However, prior fiber optic splice trays were only able to hold a small number of spliced pairs of optical fibers. Therefore, many fiber optic splice trays were necessary in order to join optical fiber cables that have many optical fibers. Additionally, transition trays were necessary when the number of fibers exceeded the capacity of the tray. One problem with the prior fiber optic splice trays was that using multiple fiber optic splice trays and transition trays makes instillation cumbersome and increases material and labor costs.

It is an object of this invention, as embodied in the non-limiting and exemplary embodiments disclosed herein, to overcome or avoid these problems, and increase the ease of use and lower the material and labor costs of installing fiber optic splice trays. Also, it is an object of this invention to increase the capacity of fiber optic splice trays.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any or all of the problems described above.

According to an aspect of the present invention, there is provided a fiber optic splice tray including an organizer plate, a first manifold and a second manifold provided in the organizer plate, wherein the first manifold is stacked on the second manifold forming a stack of manifolds.

According to another aspect of the present invention, there is provided a fiber optic splice tray wherein the organizer plate also includes a projection, wherein the projection has a notch formed therein, and wherein the first manifold is inserted into the notch formed in the projection.

According to another aspect of the present invention, there is provided a fiber optic splice tray wherein the first manifold also includes a manifold base and a manifold top, wherein the manifold base has a length that is greater than the manifold top, and wherein the manifold base is inserted into the notch formed in the projection.

According to another aspect of the present invention, there is provided a fiber optic splice tray wherein the first manifold is provided to be offset from a center of the organizer plate.

According to another aspect of the present invention, there is provided a fiber optic splice tray that also includes a plurality of stacks of manifolds.

According to another aspect of the present invention, there is provided a fiber optic splice tray that also includes an organizer lid, wherein the organizer lid has a slit provided in it, wherein the organizer plate has a first tab, and wherein when the organizer lid is placed on the organizer plate, the first tab is inserted into the slit, and the first tab protrudes from the organizer lid.

According to another aspect of the present invention, there is provided a fiber optic splice tray further including a second tab provided on the organizer plate, wherein the first tab has a longer length than the second tab.

According to another aspect of the present invention, there is provided a fiber optic splice tray wherein the organizer plate also includes a projection, wherein the projection has a curved guide section that is able to guide optical fibers towards a plurality of manifolds without making any sharp bends in the optical fibers.

According to another aspect of the present invention, there is provided a fiber optic splice tray wherein the projection is formed in a kidney shape.

According to another aspect of the present invention, there is provided a fiber optic splice tray wherein the organizer plate also includes a non-circular hole provided near a center of the organizer plate.

According to another aspect of the present invention, there is provided a fiber optic splice tray wherein the organizer plate also includes a plurality of extensions which are capable of holding fiber optic fibers in the organizer plate.

According to another aspect of the present invention, there is provided a fiber optic splice tray that also includes an organizer lid, wherein the organizer lid prevents the first manifold from coming out of the organizer plate when the organizer lid is placed on the organizer plate.

According to another aspect of the present invention, there is provided a fiber optic splice tray wherein the organizer plate has an outer periphery which has a curved shape.

According to another aspect of the present invention, there is provided a fiber optic splice tray wherein the outer periphery of the organizer plate has an elliptical shape.

According to another aspect of the present invention, there is provided a fiber optic splice tray wherein the outer periphery of the organizer plate has a circular shape.

According to another aspect of the present invention, there is provided a fiber optic splice tray wherein the splice tray has at least a 72 fiber capacity.

According to another aspect of the present invention, there is provided a fiber optic splice tray of claim 1 wherein the organizer plate also includes a wall that is provided around an outer periphery of the organizer plate, wherein a gap is provided on the organizer plate at which the wall is not provided at the outer periphery of the organizer plate, and wherein a plurality of holes are provided in the organizer plate near the gap.

According to another aspect of the present invention, there is provided a manifold for holding optical fibers including a manifold top and a manifold base provided on the bottom of the manifold top, wherein a plurality of grooves are formed in the manifold top, and wherein the manifold base has a longer length than the manifold top.

BRIEF DESCRIPTION OF THE DRAWINGS

These and/or other aspects of the present invention will become apparent and more readily appreciated from the following description of the exemplary embodiments, taken in conjunction with the accompanying drawings, in which.

DETAILED DESCRIPTION OF THE INVENTION

Figure 1:
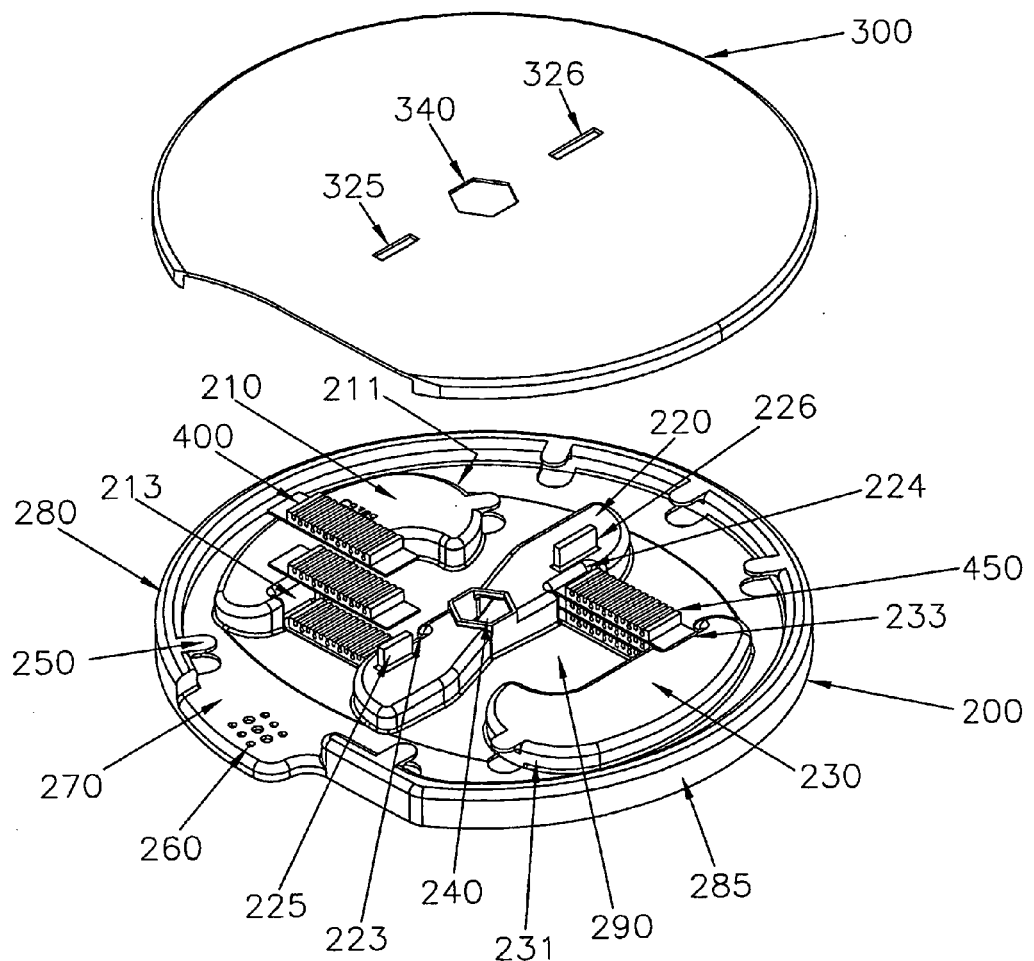
FIG. 1 illustrates an exemplary embodiment of a fiber optic splice tray.

In the following description, the same drawing reference numerals are used for the same elements in different drawings. The matters defined in the description, such as detailed construction and element descriptions, are provided to assist in a comprehensive understanding of the invention. Also, well-known functions or constructions are not described in detail since they would obscure the invention with unnecessary detail.

FIG. 1 illustrates an exemplary embodiment of a fiber optic splice tray 100. In FIG. 1, the fiber optic splice tray 100 includes an organizer plate 200. The organizer plate 200 has an organizer plate base 290 and a wall 280 that extends in an upward direction from the organizer plate base 290 and along a periphery of the organizer plate 200. Also, there is a gap 270 at which the wall 280 is not provided at the periphery of the organizer plate 200. The gap 270 allows for the optical fibers to be held by the fiber optic splice tray 100 to enter the organizer plate 200. Also, the organizer plate 200 has multiple holes 260 at the gap 270. Cable ties or other fastening means (not shown) are able to be inserted into the multiple holes 260, and the cables ties are able to hold optical fibers (not shown) to the organizer plate 200. While this embodiment uses the multiple holes to hold the optical fibers, one skilled in the art would know of many other ways to hold the optical fibers.

Also, the organizer plate 200 in the exemplary embodiment has an outer periphery 285 which is curved and has a generally circular shape with the wall 280 also being formed in a circular shape. One skilled in the art would know of many other shapes in which the organizer plate 200 could be formed, but providing the organizer plate with an outer periphery 285 in a curved or circular shape has the following advantages. Namely, this curved shape allows for the optical fibers to travel along the outer periphery 285 of the organizer plate 200 without making any sharp bends or angles in the optical fibers. Preventing the optical fibers from making sharp bends allows the optical fibers to have a large bend radius and prevents a loss of optical signal from occurring at a sharp bend. Furthermore, the organizer plate 200 also has multiple extensions 250 which extend from the top of the wall 280 in a horizontal direction. The extensions 250 have the ability to hold optical fibers in the organizer plate 200.

FIG. 1 also shows that the organizer plate 200 includes projections 210, 220, and 230 that extend from the organizer plate base 290 of the organizer plate in an upward direction. Additionally, one skilled in the art would recognize that the number of projections may be varied. Projections 210 and 230 are formed in a general kidney shape with curved guide sections 211 and 231, respectively. The curved guide sections 211 and 231 are able to guide the optical fibers towards the manifolds 400 without making any sharp bends in the optical fibers and therefore keep a large bend radius in the optical fibers. Also, there are extensions 250 provided at the top of the curved guide sections 211 and 231 that have the ability to hold optical fibers in the organizer plate 200.

The fiber optic splice tray 100 also has manifolds 400 provided in the organizer plate 200. The manifolds 400 are capable of holding the spliced sections of the optical fibers. While the exemplary embodiment of FIG. 1 has six manifolds 400, one skilled in the art would recognize that the number of manifolds may be varied.

Figure 2:
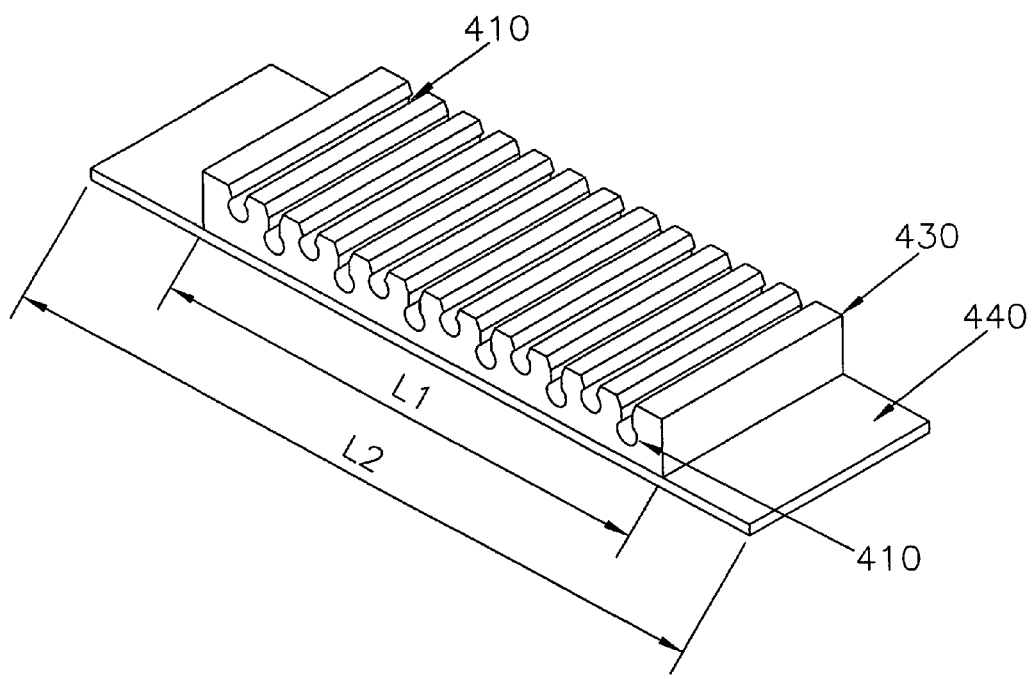
FIG. 2 is a more detailed view of the manifold of FIG. 1.

FIG. 2 is a more detailed view of the manifold 400 of FIG. 1. The manifold 400 has grooves 410 capable of holding the spliced sections of optical fibers. A first optical fiber may come from one of the curved guide sections 211 or 231 to the manifold 400, and a second optical fiber may come from the opposite direction to the manifold 400. These two optical fibers may then be spliced, and the spliced section may be inserted into the grooves 410 to be held. While the exemplary embodiment of FIG. 1 has twelve grooves 410 per manifold 400, one skilled in the art would recognize that the number of grooves 410 per manifold may be varied.

Also, in the exemplary embodiment, manifold 400 has a manifold top 430 and a manifold base 440. The manifold top 430 has a length L1, and the manifold base 440 has a length L2. L1 and L2 satisfy the relationship that L1<L2. Additionally, one skilled in the art would recognize that the manifold 400 may be made to be uniform without a distinct manifold top 430 or manifold base 440.

As shown in FIG. 1, projections 210, 220, and 230 have notches 213, 223, 224, and 233 formed in the projections. The manifold bases 440 are inserted into these notches which prevents horizontal movement of the manifolds 400. Also, as shown in FIG. 1, multiple manifolds 400 are stacked on top of each other to form manifold stacks 450. Forming manifold stacks 450 has the advantage of being able to hold a large number of spliced sections of optical fibers in a small space because fibers can be held at multiple levels of manifolds 400. The current embodiment has two sets of manifold stacks 450 with three manifolds 400 in each stack, and each manifold has twelve grooves 410. Therefore, the exemplary embodiment of FIG. 1 has a fiber capacity of 72 fibers, where the fiber capacity is calculated by the number of spliced pairs of optical fibers that the fiber optic splice tray 100 can hold in manifolds 400. Additionally, one skilled in the art would recognize that the number of manifolds 400 in each manifold stack 450 and the number of manifold stacks 450 may be varied.

Figure 3:
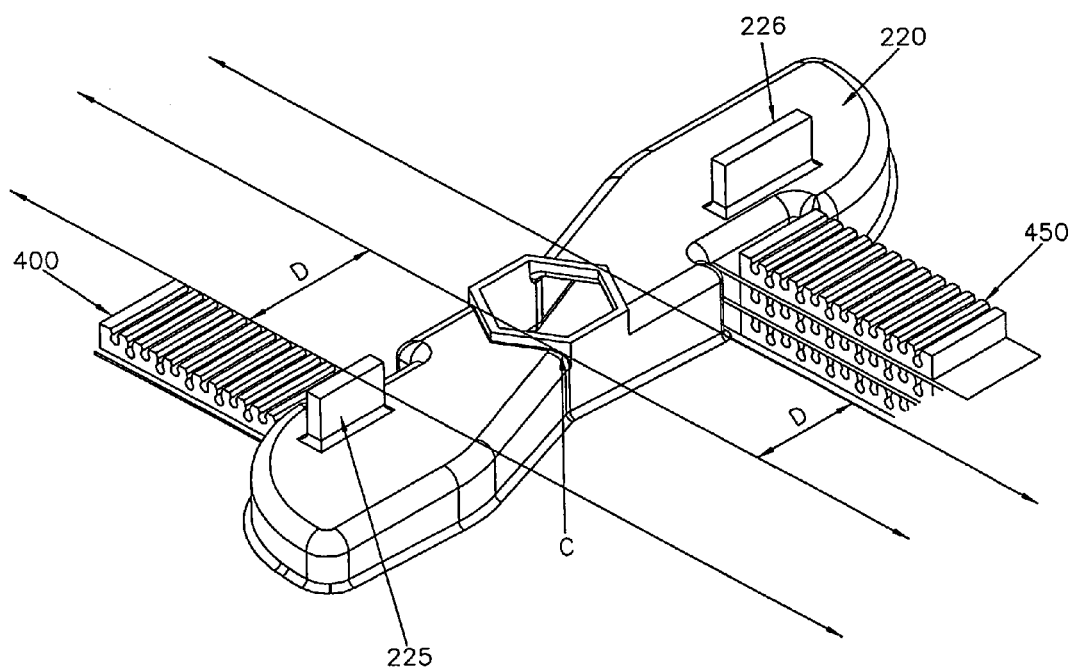
FIG. 3 is a more detailed view of the fiber optic splice tray of FIG. 1.

Also, in the exemplary embodiment, the manifold stacks 450 are provided to be offset from the center C of the organizer plate 200. As shown in FIG. 3, there is a distance d between a line that runs along the length of the manifold stack 450 and a line that runs through the center C of the organizer plate 200 that is parallel with the line that runs along the length of the manifold stack 450. While one skilled in the art would have recognized that the manifold stacks 450 may not be offset, providing the manifold stacks 450 to be offset produces at least the following advantage. Namely, providing the manifold stacks 450 to be offset allows for the optical fibers to have an increased bend radius because there is a greater distance between the curved guide sections 211 or 231 and the manifold stack 450 which allows the optical fibers that are held at outer grooves of the manifold stack 450 to more gradually reach the outer grooves without having to make any sharp bends.

Additionally, the fiber optic splice tray 100 also includes an organizer lid 300. The organizer lid 300 is designed to be placed on top of the organizer plate 200. Also, in the exemplary embodiment, when the organizer lid 300 is place on top of the organizer plate 200, the organizer lid 300 prevents the manifolds 400 from coming out of the organizer plate 200. Additionally, one skilled in the art would recognize that there are other ways to prevent the manifolds 400 from coming out of the organizer plate 200.

Figure 4:
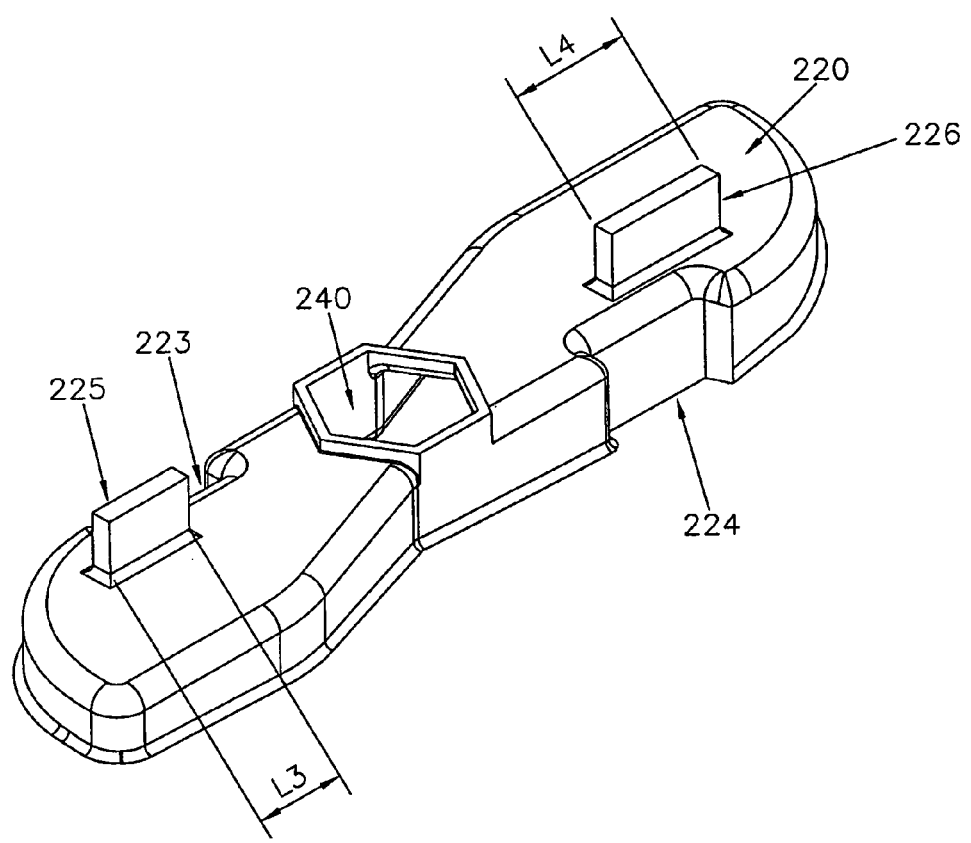
FIG. 4 is a more detailed view of the fiber optic splice tray of FIG. 1.

In the exemplary embodiment, the projection 220 also includes a first tab 225 and a second tab 226 that extend in an upward direction from the projection 220. Also, as shown in FIG. 4, first tab 225 has a length L3, and second tab 226 has a length L4, and L3 and L4 satisfy the relationship that L3<L4. Additionally, the organizer lid 300 has a first slit 325 and second slit 327 that correspond to first tab 225 and second tab 226 respectively, and first slit 325 has a length similar to L3, and second slit 326 has a length similar to L4. While one skilled in the art would recognize that the tabs may be varied in number or not provided at all, providing the first and second tabs 225 and 226 produces at least the following advantages. Specifically, when the organizer lid 300 is placed on top of organizer plate 200, the first tab 225 and second tab 226 are inserted into the first slit 325 and second slit 326 respectively. Because L3 and L4 satisfy the relationship that L3<L4, the organizer lid 300 can only be placed on top of organizer plate 200 in one way. Additionally, when the organizer lid 300 is placed on top of the organizer plate 200, the first tab 225 and second tab 226 protrude from the organizer lid giving a user the ability to grab on to the first and second tabs 225 and 226 in order to move the fiber optic splice tray 100.

Additionally, the organizer plate 200 has a non-circular hole 240 provided near the center of the organizer plate 200. In the exemplary embodiment of FIG. 1, the non-circular hole 240 is in the shape of a hexagon. Also, organizer lid 300 has a non-circular hole 340 which corresponds to the non-circular hole 240 and has the same general shape and size as non-circular hole 240. While one skilled in the art would recognize that the non-circular holes 240 and 340 do not have to be provide, the non-circular holes 240 and 340 allow for the fiber optic splice tray 100 to be mounted on a non-circular structure (not shown) which prevents the fiber optic splice tray 100 from rotating when mounted.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A fiber optic splice tray comprising:
   an organizer plate which comprises a first projection formed by a first wall which extends around the first projection, the first wall having a first curved guide section which is configured to receive and guide optical fibers around the first projection along an edge of the first wall, and the first wall comprises a first notch formed therein,
   a first manifold and a second manifold provided in the organizer plate,
   wherein an end of the first manifold and an end of the second manifold are inserted into the first notch such that the first manifold is stacked on the second manifold forming a stack of manifolds; and
   wherein the first manifold further comprises a manifold base and a manifold top and a plurality of grooves formed in the manifold top,
   wherein a length of the manifold base is greater than a length of the entire manifold top, wherein the length of the manifold base and the length of the manifold top extend in a same direction along a length of the first manifold, and wherein said direction is substantially perpendicular to an axis of said plurality of grooves, and
   wherein the manifold base is inserted into the first notch formed in the first projection.

2. The fiber optic splice tray of claim 1 wherein the organizer plate further comprises a second projection spaced apart from the first projection by a gap, the second projection is formed by a second wall which extends around the second projection, the second wall having a second curved guide section which is configured to receive and guide the optical fibers around the second projection along an edge of the second wall, and the second wall comprises a second notch formed therein, and
   wherein another end of the first manifold and another end of the second manifold are inserted into the second notch formed in the second projection such that the first manifold and the second manifold span the gap.

3. The fiber optic splice tray of claim 2 wherein the manifold base is inserted into the second notch of the second projection.

4. The fiber optic splice tray of claim 1 further comprising a plurality of stacks of manifolds.

5. The fiber optic splice tray of claim 1 further comprising an organizer lid, wherein the organizer lid has a slit provided in it,
   wherein the organizer plate has a first tab,
   and wherein when the organizer lid is placed on the organizer plate, the first tab is inserted into the slit, and the first tab protrudes from the organizer lid.

6. The fiber optic splice tray of claim 5 further comprising a second tab provided on the organizer plate,
   wherein the first tab has a longer length than the second tab.

7. The fiber optic splice tray of claim 1
   wherein the first projection has the first curved guide section that guides the optical fibers towards the first manifold without making any sharp bends in the optical fibers.

8. The fiber optic splice tray of claim 7 wherein the first projection is formed in a kidney shape.

9. The fiber optic splice tray of claim 1 wherein the organizer plate further comprises a non-circular hole provided at a center of the organizer plate.

10. The fiber optic splice tray of claim 1 wherein the organizer plate further comprises a plurality of extensions which are capable of holding fiber optic fibers in the organizer plate.

11. The fiber optic splice tray of claim 1 further comprising an organizer lid, wherein the organizer lid prevents the first manifold from coming out of the organizer plate when the organizer lid is placed on the organizer plate.

12. The fiber optic splice tray of claim 1 wherein the organizer plate has an outer periphery which has a curved shape.

13. The fiber optic splice tray of claim 12 wherein the outer periphery of the organizer plate has an elliptical shape.

14. The fiber optic splice tray of claim 12 wherein the outer periphery of the organizer plate has a circular shape.

15. The fiber optic splice tray of claim 1 wherein the splice tray has at least a 72 fiber capacity.

16. The fiber optic splice tray of claim 1 wherein the organizer plate further comprises a wall that is provided around an outer periphery of the organizer plate,
   wherein a gap is provided on the organizer plate at which the wall is not provided at the outer periphery of the organizer plate, and wherein a plurality of holes are provided in the organizer plate near the gap.

17. The fiber optic splice tray of claim 1, wherein the organizer plate comprises a base surface and the first wall extends from the base surface to form an upper surface of the first projection.

* * * * *